United States Patent
Le Meur et al.

(10) Patent No.: US 9,589,370 B2
(45) Date of Patent: Mar. 7, 2017

(54) METHOD FOR ASSISTING WITH THE SEARCH FOR AN ELEMENT, AND ASSOCIATED DEVICE AND VEHICLE

(71) Applicant: THALES, Neuilly sur Seine (FR)

(72) Inventors: Alain Le Meur, Elancourt (FR); Olivier Koch, Elancourt (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/787,095

(22) PCT Filed: Apr. 23, 2014

(86) PCT No.: PCT/EP2014/058271
§ 371 (c)(1),
(2) Date: Oct. 26, 2015

(87) PCT Pub. No.: WO2014/173972
PCT Pub. Date: Oct. 30, 2014

(65) Prior Publication Data
US 2016/0086351 A1    Mar. 24, 2016

(30) Foreign Application Priority Data
Apr. 26, 2013 (FR) .................................. 13 00982

(51) Int. Cl.
*G06K 9/00* (2006.01)
*G06T 7/40* (2006.01)
(Continued)

(52) U.S. Cl.
CPC ............ *G06T 7/408* (2013.01); *G06K 9/3241* (2013.01); *G06K 9/4652* (2013.01);
(Continued)

(58) Field of Classification Search
CPC . G06T 2207/10016; G06T 2207/10024; G06T 7/408; G06T 7/0081; H04N 9/646;
(Continued)

(56) References Cited

U.S. PATENT DOCUMENTS

| | | | |
|---|---|---|---|
| 5,134,465 A * | 7/1992 | Ohki | ........................ H04N 9/68 348/649 |
| 2006/0225335 A1 | 10/2006 | Florence et al. | |

(Continued)

OTHER PUBLICATIONS

Cheng et al., "Color Image Segmentation: Advances and Prospects", Pattern Recognition, 2001, pp. 2259-2281, vol. 34.
(Continued)

*Primary Examiner* — Yon Couso
(74) *Attorney, Agent, or Firm* — Thompson Coburn LLP

(57) ABSTRACT

The invention relates to a method for assisting with the search for an element (E) having a predefined hue in an environment, the method comprising the provision of at least one image in color, said or each image comprising pixels, the method being characterized in that the method comprises the selection in said or each image of the pixels having a hue for which value of the parameter associated through the bijection is comprised between first and second values, the first and second values being chosen so that the set of hues, for which value of the parameter associated through the bijection is comprised between both chosen values, comprises the predefined hue.

10 Claims, 2 Drawing Sheets

Figure 1:
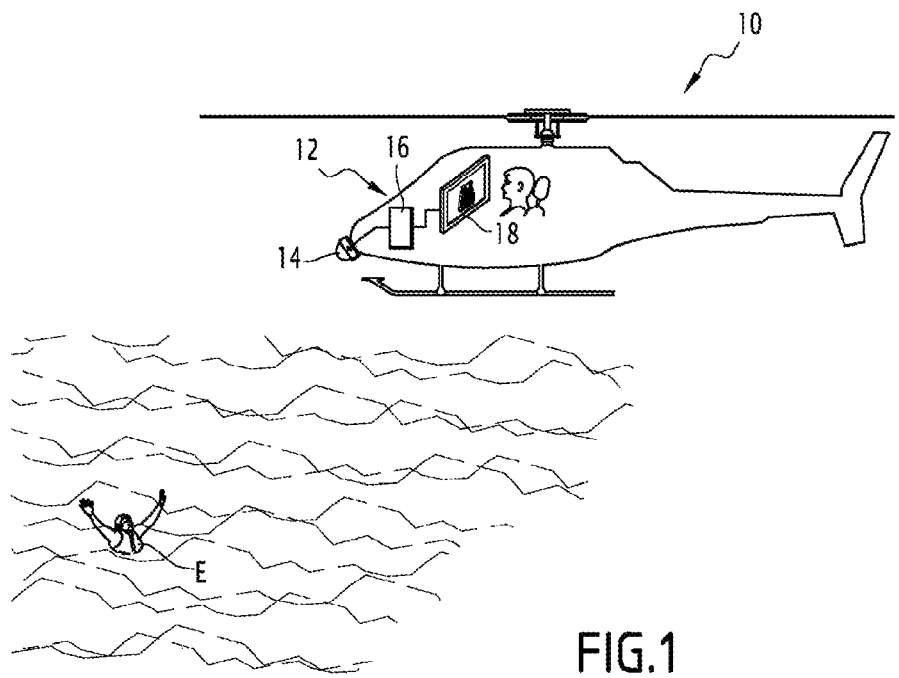

(51) Int. Cl.

| | |
|---|---|
| *H04N 9/64* | (2006.01) |
| *H04N 9/68* | (2006.01) |
| *G06K 9/32* | (2006.01) |
| *G06K 9/46* | (2006.01) |
| *G06T 7/00* | (2006.01) |
| *H04N 5/225* | (2006.01) |

(52) U.S. Cl.
CPC ........... *G06T 7/0081* (2013.01); *H04N 5/225* (2013.01); *H04N 9/646* (2013.01); *H04N 9/68* (2013.01); *G06T 2207/10016* (2013.01); *G06T 2207/10024* (2013.01)

(58) Field of Classification Search
CPC .......... H04N 5/225; H04N 9/68; H04N 9/643; G06K 9/3241; G06K 9/4652
USPC ........................................................ 382/165
See application file for complete search history.

(56) References Cited

U.S. PATENT DOCUMENTS

| | | | |
|---|---|---|---|
| 2008/0252794 A1 | 10/2008 | Su et al. | |
| 2008/0273794 A1* | 11/2008 | Samworth ............ | H04N 1/6022 382/167 |
| 2010/0302400 A1* | 12/2010 | Maesato ................ | H04N 9/045 348/222.1 |

OTHER PUBLICATIONS

Mortimer, "Automated Life Jacket Detection Enhances Search and Rescue Operations", Sentient, Feb. 20, 2011, sUAS News.

\* cited by examiner

METHOD FOR ASSISTING WITH THE SEARCH FOR AN ELEMENT, AND ASSOCIATED DEVICE AND VEHICLE

CROSS-REFERENCE TO RELATED APPLICATIONS

This application national stage application of PCT/EP2014/058271, filed Apr. 23, 2014, which claims the benefit of French Application FR 1300982, filed Apr. 26, 2013, each of which is incorporated herein by reference in its entirety.

The present invention relates to a method for assisting with the search for an element in an environment. The present invention also relates to a device for assisting with the search for an element in an environment and to a vehicle comprising such a device.

The invention notably applies to the field of marine patrol airplanes with the mission of searching for and assisting shipwrecked persons.

In order to achieve such a mission, the marine patrol airplanes are generally equipped with a camera mounted on a motor-driven structure, the line of sight of which may be oriented. This gives the possibility of performing scans of an area, notably large extents of water, for searching for persons, lifeboats or distress smoke. The images taken with the camera are displayed to an operator who is responsible for detecting the persons to be rescued. For this detection, the operator uses the fact that the survival equipment generally has a hue with a strong contrast with the hue of the environment. For example, a life jacket is usually of a yellow, orange or red hue while the sea is a natural medium of a blue-green hue.

However, in spite of the strong hue contrast between the survival equipment and the environment, the shipwrecked person or the survival equipment only represents a few pixels on the image displayed to the operator when the distance between the patrol airplane and the shipwrecked person is significant. Further, the illumination conditions, low luminosity or interfering ambient light, also makes the detection of the shipwrecked person or of the survival equipment difficult. Thus, the probability of detecting the shipwrecked person or the survival equipment by the operator is then low, which reduces the probability of rescuing the shipwrecked person in due time.

Therefore there exists a need for a method for assisting with the search which allows a better detection of the person(s) to be rescued in the environment.

According to the invention, this goal is achieved with a method for assisting with the search for an element having a predefined hue in an environment. The method comprises the provision of at least one color image, said or each image comprising pixels. The method further comprises the expression of the hue of at least one portion of the pixels of said or each image in a colorimetric system, the colorimetric system being defined by the existence of a continuous bijection from the set of hues of the visible spectrum to the set of values of a parameter, the bijection associating a hue with a value of the parameter and the set of values of the parameter having a total extent. The method also comprises the selection in said or each image of the pixels having a hue for which the value of the parameter associated by the bijection is comprised between a first and a second values, the first and second values being chosen so that the set of hues, for which the value of the parameter associated by the bijection is comprised between two chosen values, comprises the predefined hue. The method also includes the highlighting of the selected pixels.

According to particular embodiments, the method comprises one or several of the following features, taken individually or according to all the technically possible combinations:

the expression of the hue of at least one portion of the pixels of said or each image in the colorimetric system is implemented by converting said or each image in at least one portion of the colorimetric base TSL.

the highlighting of the selected pixels comprises the setting of the saturation and luminance parameters of the selected pixels to a value greater than 75% of the maximum value, preferably equal to the maximum value.

the highlighting of the selected pixels comprises the modification of the hue of the selected pixels and/or the introduction of blinking between two different images.

the selection of the pixels is implemented by selecting pixels having a hue for which the value of the parameter associated through the bijection is comprised in at least one set of a plurality of sets, the sets being chosen so that the sets are disjoint and so that each value belonging to one of the sets is comprised between the first and the second values.

the providing of at least one color image is implemented by acquiring a video stream.

the environment is the sea and the element is chosen from a group consisting of a life jacket, a distress smoke, a lifeboat, a survival suit, a life buoy, and a rescue ship.

both chosen values take into account the weather conditions of the environment.

The invention also relates to a device for assisting the search for an element in an environment. The device comprises a camera suitable for taking at least one color image, the image or each image comprising a set of pixels. The device further comprises a calculator suitable for implementing the following steps:

expressing the hue of at least one portion of the pixels of said or each image in a colorimetric system, the colorimetric system being defined by the existence of a continuous bijection from the set of hues of the visible spectrum to the set of values of a parameter, the bijection associating one hue to a value of the parameter and the set of values of the parameter having a total extent, and selecting in said or each image of a set of pixels having a hue for which the value of the parameter associated through the bijection is comprised between two chosen values, both chosen values being such that the set of hues, for which the value of the parameter associated through the bijection is comprised between both chosen values, comprises the predefined hue, and highlighting the selected pixels.

Further, the invention also relates to a vehicle comprising a device as described earlier.

Figure 2:
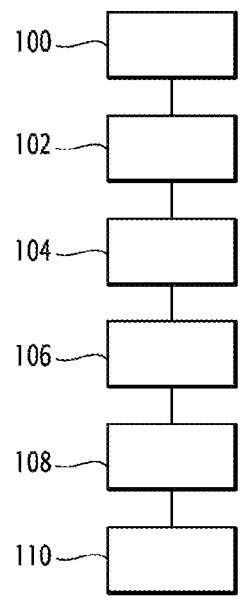
Figure 3:
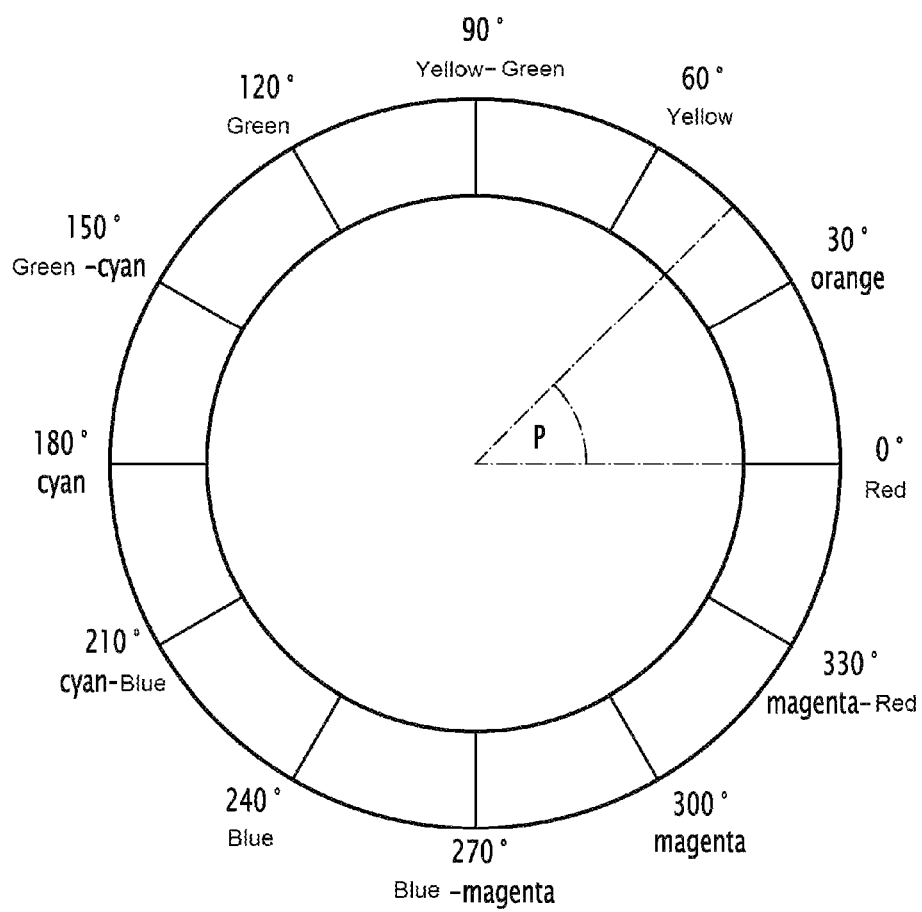

Other features and advantages of the invention will become apparent upon reading the description which follows of embodiments of the invention, only given as an example and with reference to the drawings which are:

FIG. 1, a schematic view of an aircraft according to the invention,

FIG. 2, a flow chart of an exemplary application of a method for assisting the search according to the invention, and FIG. 3, an illustration of a chromatic wheel.

An aircraft 10 is illustrated in FIG. 1. The aircraft 10 of FIG. 1 is a helicopter. An aircraft 10 is any flying machine like an airplane, a drone or a satellite.

The aircraft 10 includes a device 12 for assisting with the search for an element E in an environment. The device 12 is able to assist an operator for searching for the element E in the environment.

The element E has a predefined hue. For example, if the element E is a life jacket and the environment is the sea, the element E has an orange hue.

The element E further indicates the presence of at least one person to be rescued in the environment.

The element E according to the example of FIG. 1 is an orange-colored life jacket.

Alternatively, the element E is a lifeboat, a survival suit, a lifebuoy, a rescue ship or distress smoke. The hues of these elements are usually yellow, orange or red.

The device 12 for assisting with the search includes a camera 14, a calculator 16 and a display device 18.

The camera 14 is adapted for taking images in color. The camera 14 is able to capture a set of images at a low rate so as to obtain a series of fixed images like with a still camera or at a higher rate so as to acquire sufficient images for forming a video stream.

For example, the camera 14 is able to provide a video stream, for example, in a HD-SDI video format. The acronym HD refers to high definition. The HD-SDI (high definition-serial digital interface) or high definition serial digital interface is a transport or broadcasting protocol of various digital video formats. The HD-SDI protocol is defined by the ANSI/SMPTE 292M standard. The HD-SDI protocol is particularly suitable for real-time processing of images.

The calculator 16 is able to collect the images from the camera 14 as well as to process the images in order to obtain modified images.

The display device 18 according to example of FIG. 1 is a screen able to display the operator images, for example the images from the camera 14 or the images modified by the calculator 16.

The operation of the device 12 will now be described with reference to the application by the calculator 16 of a method for assisting with the search for the element E in an environment. Such an application is illustrated by the flow chart of FIG. 2.

The method comprises a step 100 for providing at least one color image.

As a simplification, it is assumed that at this provision step 100, only one image I1 in color is provided. The logic is obviously the same if a video stream comprising a set of images is considered.

The provision step 100 is for example implemented by the camera 14.

The image I1 is a set of pixels. A pixel, often abbreviated as px or p, is the basic unit allowing measurement of the definition of an image. Its name comes from the expression « picture element », which means an element of the picture.

The method includes a step 102 for expressing the hue of at least one portion of the pixels of the image I1 in a particular colorimetric system S.

A hue is the pure form of a color, i.e. without adding white or black which allow its hues to be obtained. The hue is now used by colorists for designating a tone, i.e. the hue consisting of a certain amount of the three primary colors, without taking into account the brilliance or the saturation.

The colorimetric system S is defined by the existence of a continuous bijection f from the set of hues of the visible spectrum to the set of values of a parameter P, the bijection f associating a hue with a value of the parameter P. Thus, each hue of the light spectrum is represented by a single value of a single parameter noted as P. The light spectrum is the set of visible hues, i.e. hues corresponding to a wavelength comprised between 400 nanometers (nm) and 800 nm. The image by the bijection f of the set of hues of the visible spectrum is a continuous set of values of the parameter P. This set of values has a total extent noted as $E_{TOTAL}$.

For example, the colorimetric system S may be represented as a chromatic wheel as illustrated in FIG. 3. The chromatic wheel is a circular conventional representation of the hues ordered like in a rainbow, the closing of the circle being carried out by a transition from magenta to yellow via red. Generally, the orientation of the colors is in the direct direction (red, and then yellow, and then green, etc., . . . ). Thus, the function f is then the function which associates with each hue of the visible light its angle P on the chromatic wheel relatively to a selected reference. Generally, it is selected that red corresponds to the zero angle. In this case, the hues illustrated every 30° upon covering the chromatic wheel in the direct direction are: red at 0°, orange at 30°, yellow at 60°, yellow-green at 90°, green at 120°, green-cyan at 150°, cyan at 180°, cyan-blue at 210°, blue at 240°, blue-magenta at 270°, magenta at 300° and magenta-red at 330°. These different hues are indicated on the chromatic wheel of FIG. 3.

In the case of the chromatic wheel, the total extent $E_{TOTAL}$ corresponds to 360°. Further, the value of the parameter P associated with the predefined hue of the element E by the function f is noted as $P_{predefined}$ and has the value 30° for the orange life jacket.

Alternatively, instead of representing the hue as the previous chromatic wheel, a rectilinear strip is used.

The expression step 102 according to the flow chart of FIG. 2, is implemented by converting the image I1 in a colorimetric base TSL.

The acronym TSL refers to the terms hue, saturation, luminosity. Sometimes the acronyms HLS for « hue, saturation, lightness » are used. Saturation provides a measurement of the intensity of the color identified by its hue. The luminosity corresponds to a measurement of the amount of light. This is a colorimetric model. It allows description of the colors distinguished by human vision through the interaction of these three theoretical components. In this sense, such a model is a perceptual model.

The expression step 102 is implemented by means of the calculator 16.

The method comprises a step 104 for selecting in the image I1 the set of pixels having a hue for which the value of the parameter P associated through the bijection f is comprised between two chosen values, a first value Pmin and a second value Pmax.

Both chosen values Pmin and Pmax are such that the set of hues for which the value of the parameter P associated through the bijection f is comprised between both chosen values Pmin and Pmax, comprises the predefined hue.

According to a preferred embodiment, the operator selects the first and second values Pmin and Pmax.

The selection of the operator takes into account the hues which seem adapted for his/her search.

Most customarily, the hues taken into account are the possible hues of the element E. For example, in the selection step 104, all the pixels of the image I1, having a hue comprised between −20° and 80° are selected, −20° corresponds to a red with a magenta hue while 80° corresponds to yellow with a green hue.

According to another example, if the operator tries to detect a blue car on a sand background, he/she will rather select a value of 210° for the first value Pmin and 270° for the second value Pmax.

The operator may also consider other elements for selecting the first and second values Pmin and Pmax.

For example, the weather conditions of the environment have an influence on the perceived hue for the element E. Typically, at sunset, red hues are suppressed.

The selection step 104 is implemented by the calculator 16.

The method then comprises a step 106 for highlighting the selected pixels.

Such a step 106 comprises the modification of the image I1 in the colorimetric base TSL in order to obtain a modified image I1 noted as I2 subsequently.

For example, the saturation and luminance parameters of the selected pixels are set to a value greater than 75%, and this independently of their initial value. The thereby modified pixel then has a purer color with a pale aspect.

Preferably, the saturation and luminance parameters are set to the maximum value.

The method also includes a step 108 for converting the modified image I2 from the colorimetric base TSL into a display format suitable for the display device 18.

The conversion step 108 is implemented by means of the calculator 16.

The method includes a step 110 for displaying the modified image I2, modified on the display device 18.

The benefit of the colorimetric system S for this invention is that the hues customarily used for survival equipment (red, orange, yellow) are represented by continuous values of angles on the chromatic wheel. Thus, all the customary hues of survival equipment are found between the angles −20° (magenta-red) and +80° (yellow-green) while passing through all the hues of the red (around 0°), all the hues of the orange (around 30°) and all the hues of the yellow (around 60°). Therefore it is possible by selecting two hue limits (a minimum limit −20° and a maximum limit +80°) to filter all the pixels for which the hues correspond to those of customary survival equipment. The selection of such a type of colorimetric system S gives the possibility of performing a simple filtering processing operation with the calculator 16.

In the aircraft 10, the operator is therefore confronted with an image I2 in which pixels selected on the basis of a hue criterion are highlighted by increasing saturation and luminosity parameters. Thus, for the element E for which the hue is standardized, it becomes possible to locate it much more easily in the environment.

Indeed, even if the modified image I2 corresponds to the vision of the camera 14 at a very long distance, i.e. the element E has the extent on the image of a few pixels, the highlighting makes the element E detectable by the operator with a better chance of success.

The method therefore gives the possibility of obtaining better detection of the element E in an environment.

Alternatively, the highlighting step 106 comprises the modification of the hue of the selected pixels of the image I1 instead of changing the saturation and luminance parameters.

As an example, the selected pixels will be colored in pale yellow.

According to another alternative, the selected pixels are highlighted by blinking between two series of distinct images for example at 1 Hz in which the pixels appear differently. For example, in a series of images, the selected pixels appear black for one second while in the series of following images, the selected pixels appear pale yellow for one second. The use of blinking perceivable by the human eye is advantageous insofar that the human brain of the operator is highly adapted for detecting the modifications of an image, even minor modifications.

According to another alternative, the selected pixels are highlighted by adding particular symbols. For example, in an image, the selected pixels are surrounded by a rectangle of white color.

According to another alternative, the selected pixels are highlighted by enlarging the area in which they are found.

The invention notably finds its application in searches at sea since the environment is of a fixed color, i.e. a hue going towards blue with a strong contrast with life jackets notably in the hue s between red and yellow while passing through orange.

According to an alternative, detection is automatic. In this case, the modification step 106, the conversion step 108 and the display step 110 are not implemented.

According to another alternative, the selection step 104 is accomplished on several disjoint areas of interest, selected by the operator. In this case, the step 104 for selecting the pixels is implemented by selecting the pixels having a hue for which the value of the parameter P associated through the bijection f is comprised in at least one set of a plurality of sets, the sets being chosen so that the sets are disjoint and that each value belonging to one of the sets, is comprised between the first and second values Pmin, Pmax.

The invention claimed is:

1. A method for assisting with the search for an element having a predefined hue in an environment, the method comprising:
   providing at least one image in color, said or each image comprising pixels;
   expressing the hue of at least one portion of the pixels of said or each image in a colorimetric system, the colorimetric system being defined by the existence of a continuous bijection from the set of hues of the visible spectrum to the set of values of a parameter, the bijection associating a hue with a value of the parameter and the set of values of the parameter having a total extent;
   selecting in said or each image pixels having a hue for which the value of the parameter associated by the bijection is comprised between a first and a second values, the first and second values selected by an operator and being chosen so that the set of hues, for which the value of the parameter associated by the bijection is comprised between both chosen values, comprises the predefined hue; and
   highlighting the selected pixels.

2. The method according to claim 1, wherein the expression of the hue of at least one portion of the pixels of said or each image in the colorimetric system is implemented by converting said or each image into at least one portion of the colorimetric basis TSL.

3. The method according to claim 1, wherein the highlighting of the selected pixels comprises the setting of the saturation and luminance parameters of the selected pixels to a value greater than 75% of the maximum value, preferably equal to the maximum value.

4. The method according to claim 1, wherein the highlighting of the selected pixels comprises at least one of the modification of the hue of the selected pixels and the introduction of blinking between two different images.

5. The method according to claim 1, wherein the selection of the pixels is implemented by selecting pixels having a hue for which the value of the parameter associated through the bijection is comprised in at least one set of a plurality of sets, the sets being chosen so that the sets are disjoint and so that each value belonging to one of the sets is comprised between the first and the second values.

6. The method according to claim 1, wherein providing at least one image in color is implemented by acquiring a video stream.

7. The method according to claim 1, wherein the environment is the sea and the element is selected from a group consisting of a life jacket, distress smoke, a life boat, a survival suit, a life buoy, and a rescue ship.

8. The method according to claim 1, wherein both chosen values take into account the weather conditions of the environment.

9. A device for assisting with the search for an element in an environment, the device comprising:
- a camera suitable for taking at least one image in color, the image or each image comprising a set of pixels; and
- a calculator suitable for implementing the following steps:
  - expressing the hue of at least one portion of the pixels of said or each image in a colorimetric system, the colorimetric system being defined by the existence of a continuous bijection from the set of hues of the visible spectrum to the set of values of a parameter, the bijection associating a hue with a value of the parameter and the set of values of the parameter having a total extent;
  - selecting in said or each image pixels having a hue for which the value of the parameter associated by the bijection is comprised between a first and a second values, the first and second values selected by an operator and being chosen so that the set of hues, for which the value of the parameter associated by the bijection is comprised between both chosen values, comprises the predefined hue; and
  - highlighting the selected pixels.

10. A vehicle comprising a device for assisting with the search for an element in an environment, wherein the device comprises:
- a camera suitable for taking at least one image in color, the image or each image comprising a set of pixels; and
- a calculator suitable for implementing the following steps:
  - expressing the hue of at least one portion of the pixels of said or each image in a colorimetric system, the colorimetric system being defined by the existence of a continuous bijection from the set of hues of the visible spectrum to the set of values of a parameter, the bijection associating a hue with a value of the parameter and the set of values of the parameter having a total extent;
  - selecting in said or each image pixels having a hue for which the value of the parameter associated by the bijection is comprised between a first and a second values, the first and second values selected by an operator and being chosen so that the set of hues, for which the value of the parameter associated by the bijection is comprised between both chosen values, comprises the predefined hue; and
  - highlighting the selected pixels.

* * * * *